United States Patent [19]

Kanengieter et al.

[11] Patent Number: 4,796,728

[45] Date of Patent: Jan. 10, 1989

[54] BRAKE NOISE REDUCTION SYSTEM

[75] Inventors: Glenn G. Kanengieter, Owatonna; David E. Stomberg, Faribault, both of Minn.

[73] Assignee: Austoft Inc. (U.S.A.), Owatonna, Minn.

[21] Appl. No.: 73,399

[22] Filed: Jul. 10, 1987

Related U.S. Application Data

[63] Continuation of Ser. No. 859,472, May 5, 1986, abandoned.

[51] Int. Cl.$^4$ .............................................. F16D 65/12
[52] U.S. Cl. ..................................... 188/18 A; 74/574; 188/71.5; 188/218 A; 192/30 V; 192/70.2; 192/70.17
[58] Field of Search ........... 188/218 A, 218 XL, 73.2, 188/73.1, 765, 72.7, 73.36, 73.37, 264 G, 264 A, 18 A; 192/70.2, 107 R, 107 C, 30 V, 70.17, 70.19; 74/574

[56] References Cited

U.S. PATENT DOCUMENTS

| | | | |
|---|---|---|---|
| 1,979,880 | 11/1934 | Heinrich | 192/107 R X |
| 2,808,129 | 10/1957 | Kraus | 188/218 XL X |
| 2,815,104 | 12/1957 | Du Shane | 188/72.7 |
| 2,987,143 | 6/1961 | Culbertson et al. | 188/264 A X |
| 3,148,756 | 9/1964 | Romanini | 188/218 R X |
| 3,228,493 | 1/1966 | Kershner | 188/72.7 |
| 3,295,647 | 1/1967 | Murphy | 188/71.5 X |
| 3,455,180 | 7/1969 | Wagenfuhrer | 74/574 |
| 3,840,094 | 10/1974 | Klee et al. | 188/31 |
| 3,982,611 | 9/1976 | Gannon | 188/73.2 X |
| 4,026,393 | 5/1977 | Gebhardt et al. | 188/218 A X |
| 4,102,443 | 7/1978 | Kohler et al. | 188/218 XL |
| 4,124,084 | 11/1978 | Albright et al. | 180/6.48 |
| 4,150,587 | 4/1979 | Bremer, Jr. | 74/574 |
| 4,480,708 | 11/1984 | Macht et al. | 188/72.7 X |

FOREIGN PATENT DOCUMENTS

| | | | |
|---|---|---|---|
| 1255140 | 1/1961 | France | 188/218 A |
| 46124 | 4/1981 | Japan | 188/218 XL |
| 868970 | 5/1961 | United Kingdom | 188/218 XL |

*Primary Examiner*—George E. A. Halvosa
*Attorney, Agent, or Firm*—Dorsey & Whitney

[57] ABSTRACT

A brake noise reduction system (84) which is particularly adapted for use with the hydrostatic transmissions of vehicles such as skid-steer loaders, includes a fixed caliper assembly (86) and multiple brake disc assemblies (66) that are individually connected to the transmission. The caliper assembly (86) includes a bore (96) guiding the brake pucks (98) into selective engagement with the brake disc assemblies (84) responsive to a manual cam actuation. Each brake disc assembly (66) includes a resilient damper ring (152) secured between a retainer plate (154) and a disc plate (150) to reduce rattling of the assembly and help to reduce overall noise of the hydrostatic tranmission. The brake pucks (98) are actuated by a manual lever (132) connected to a rotatable cam (112) associated with an axial plunger (120). The cam (112) is rotatable about an axis parallel to the bore (96) in the caliper assembly (86) containing the brake pucks (98) and plunger (120) to provide a wider range of motion in a more compact space.

9 Claims, 3 Drawing Sheets

BRAKE NOISE REDUCTION SYSTEM

This is a continuation of application Ser. No. 859,472, filed May 5, 1986, now abandoned.

TECHNICAL FIELD

The present invention relates generally to a brake noise reduction system. More particularly, this invention concerns a parking brake system with reduced noise characteristics that is particularly adapted for vehicles such as skid-steer loaders in which the wheels on each side of the vehicle are independently driven by separate hydrostatic transmissions.

BACKGROUND ART

A skid-steer loader is a compact, highly maneuverable vehicle in which the wheels on opposite sides of the vehicle are independently driven through separate hydrostatic transmissions. Each hydrostatic transmission typically includes a variable displacement hydraulic pump coupled to a hydraulic motor having an output shaft which is connected by a chain and sprocket arrangement to the other wheels on the same side of the vehicle. The pumps are usually mounted in tandem and are driven by a rear-mounted engine. Manual controls are connected to displacement cams on the pumps and maneuvering is accomplished by adjusting the rate and direction of flow output from the pumps through the motor such that the wheels on each side of the vehicle are driven at the desired speeds and in the desired directions to propel and steer the vehicle.

Braking of the vehicle is normally accomplished by placing the controls and their respective pumps in the neutral or null position to interrupt fluid flow to the hydraulic motors. This technique works reasonably well on level ground while the hydrostatic drive systems are operating, however, it does not provide for possible inadvertent contact with the controls which might cause the skid-steer loader to jump out of control. Further, this type of braking generally is not satisfactory during operation over inclined surfaces, and it is not available at all when the hydrostatic drive systems are inoperative or otherwise not functioning properly. There are thus drawbacks to such hydrostatic braking.

For these reasons, skid-steer loaders are usually provided with brake systems which can be locked in engaged position in the manner of parking brakes. There are two basic approaches to such brake systems. One approach has been to provide separate brake assemblies which are individual to each transmission, but which are commonly actuated. This approach, however, is unnecessarily complicated and therefore expensive. In addition, careful adjustment must be maintained to ensure that both brake assemblies are actuated to the same degree at the same time.

Another approach has been to provide a single brake assembly which engages both transmissions. For example, U.S. Pat. No. 4,124,084 discloses a brake system with a common caliper overlying brake discs splined to the motor drive shaft of each hydrostatic transmission. Brake pucks are provided on both sides of each brake disc, and the stack of pucks is actuated by a cam shaft extending transverse to the bore in the caliper containing the pucks. In this system, however, rotational range of the cam shaft between the engaged and released positions is relatively narrow and thus permits only limited adjustment to compensate for wear of the brake pucks. More recently, U.S. Pat. No. 4,480,708 issued to Owatonna Manufacturing Company for an improved brake system incorporating a different actuater arrangement which provides for a wider range of adjustment.

In addition to the problem of effective braking, there is also the problem of effective noise control with hydrostatic transmissions. Skid-steer loaders incorporate dual hydrostatic transmissions, each of which includes a hydraulic drive pump characterized by high pressure, pulsatile operation. A great deal of vibration is thus transferred from the hydraulic drive pumps through the transmissions, which in turn can become quite noisy during operation. The operator sits ahead of the engine and over the transmissions, and thus the vibration and noise can be a significant factor in operating a skid-steer loader. In some cases, this noise factor can be aggravated when a brake system is connected to the hydrostatic transmissions. Both of the brake systems shown in U.S. Pat. Nos. 4,124,084 and 4,480,708 incorporate brake discs splined to driven shafts for limited sliding movement responsive to actuation of the brake pucks. At certain loads and speeds this splined connection can cause severe rattle noise, which is not only distracting and wearisome, but which also sounds like there may be a loose drive chain or another problem developing in the transmissions. Heretofore, there has not been available a practical and economical technique for reducing noise associated with the hydrostatic transmissions and brake systems of skid-steer loaders.

SUMMARY OF INVENTION

The present invention comprises a brake noise reduction system which overcomes the forgoing and other difficulties associated with the Prior Art. In accordance with the invention, there is provided an improved brake disc for use in disc brake systems of hydrostatic transmissions in skid-steer loaders. The improved brake disc assembly comprises a disc plate, a dampener ring of resilient material, and a retainer plate secured together with each including a central through hole for connection to a splined shaft driven by the hydrostatic transmission. In the preferred embodiment, a ring of holes is also provided about the disc plate inward of the outer portion swept by the brake discs so as to reduce weight inertia and to reduce the bell ring effect associated with a heavy flat plate. Although the brake noise reduction system is particular adapted for use in skid-steer loaders, it will be understood that the invention can be utilized with hydrostatic transmissions in other vehicles incorporating brake discs splined to driven shafts that are characterized by relatively high vibration and noise levels.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
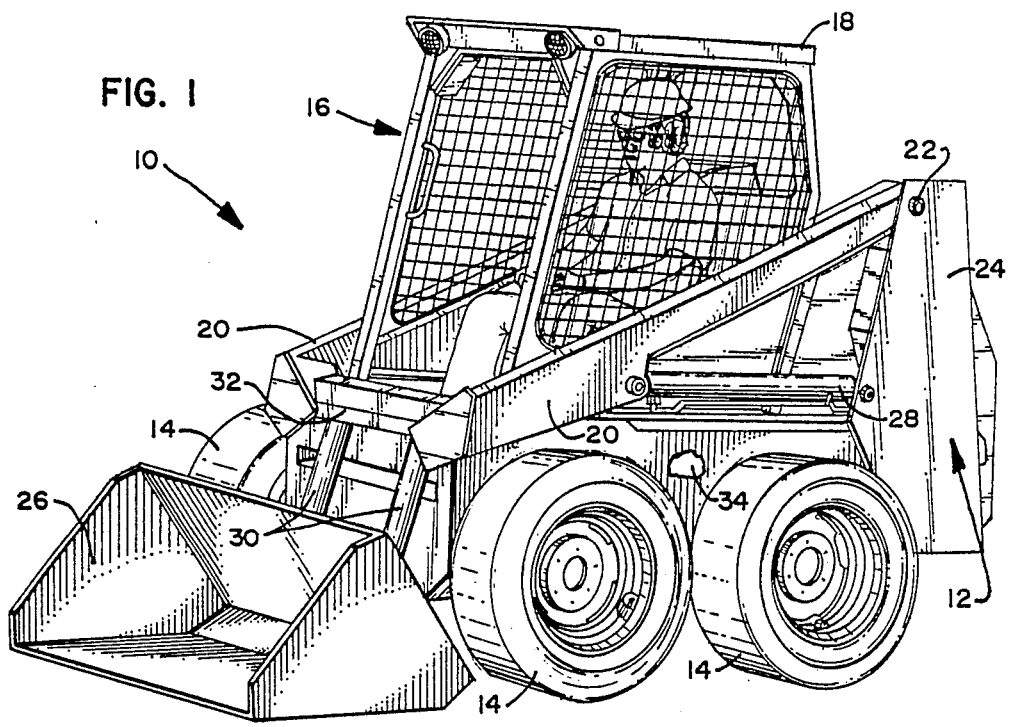
FIG. 1 is a perspective view of a skid steer incorporating the brake noise reduction system of the invention.

Referring now to the Drawings, wherein like reference numerals designate like or corresponding elements throughout the view, and particularly refering to FIG. 1, there is shown a skid steer loader 10 for which the brake noise reduction system of the invention is particularly adapted. The skid steer loader 10 includes a frame 12 with a set of wheels 14 on each side thereof mounted on a relatively short wheelbase. An operator's compartment 16 including a roll cage and a seat, is located between a pair of lift arms 20. The inner ends of lift arms 20 are pivoted at points 22 to frame upright 24 behind the operator's compartment 16. An implement such as a bucket 26 is pivoted to the outer ends of the lift arms 20. Raising and lowering of the lift arms is effected by a pair of double acting cylinders 28, one of which is coupled between each lift arm and its corresponding upright 24. Tilting of the bucket 26 is effected by another pair of double acting cylinders 30 coupled between the bucket and a cross member 32 extending between the lift arms 20.

Suitable controls including foot pedals (not shown) and a T bar (not shown) are provided within the operator's compartment 16 for controlling the skid steer loader 10. A rear mounted engine (not shown) drives a tandem pump assembly 34 including two variable disc displacement hydraulic pumps connected to the hydraulic drive motors of the respective hydrostatic transmissions for independently driving the wheels 14 on each side of the loader 10. The T-bar handle is connected to the pump assembly 34 and maneuvering of the skid steer leader 10 is accomplished in the well known manner by manipulating the T-bar handle to effect differential or simultaneous drive of the wheels 14 on each side of the vehicle as desired. The T-bar control handle is preferably constructed as shown in U.S. Pat. No. 3,792,744 to the assignee hereof, the entire disclosure of which is incorporated herein by reference.

Also provided, as will be explained more fully hereinafter, is the improved brake noise reduction system of the invention which functions primarily to reduce noise and vibration associated with the disc brakes, but which also serves to reduce overall noise associated with the hydrostatic transmissions. The present invention is an improvement over the brake system shown in U.S. Pat. No. 4,480,708 to the assignee hereof, the disclosure of which is also incorporated herein by reference.

Figure 2:
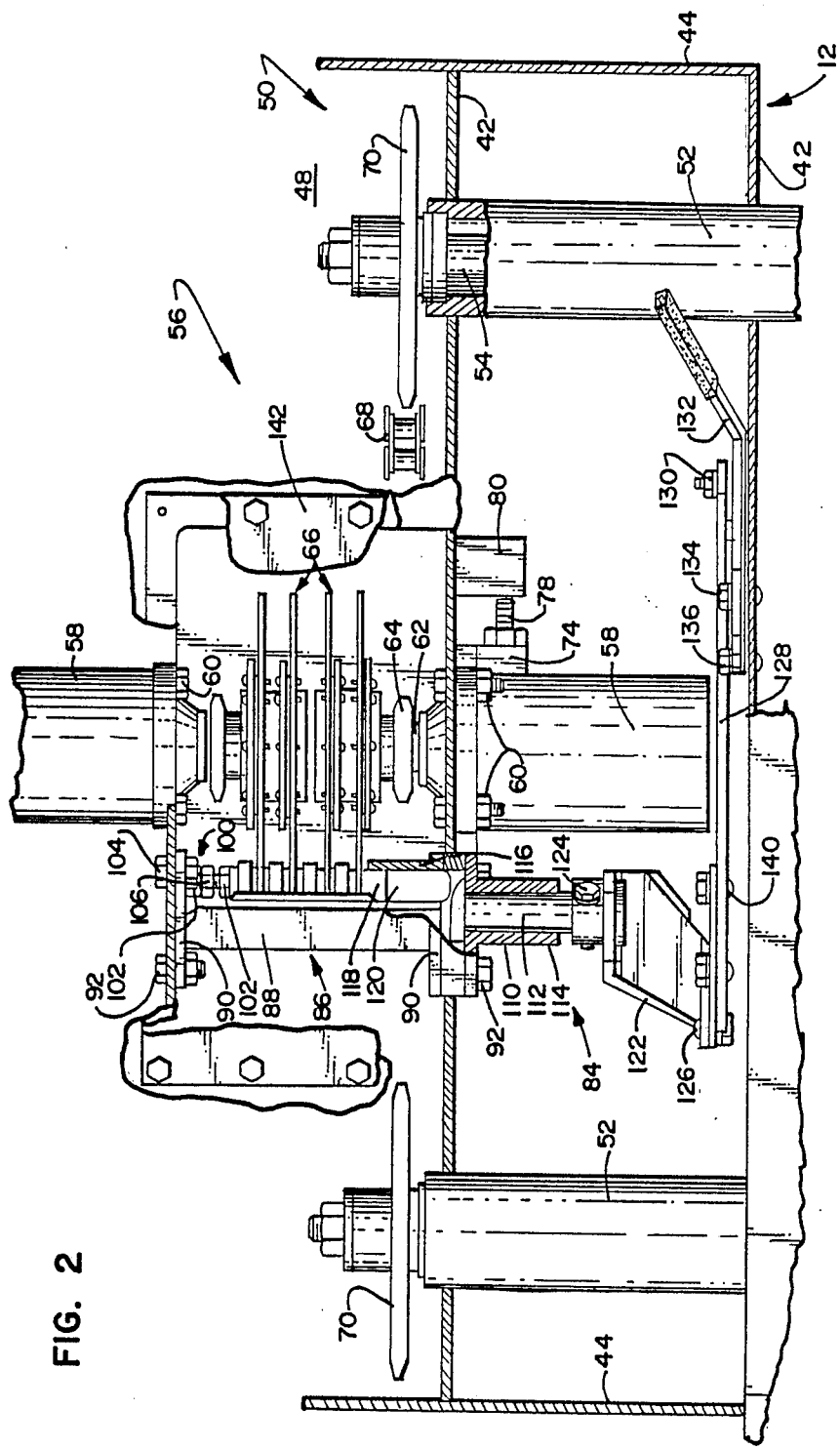
FIG. 2 is a top view of a portion of the loader frame showing the brake noise reduction system of the invention, in which certain parts have been broken away for clarity.
Figure 3:
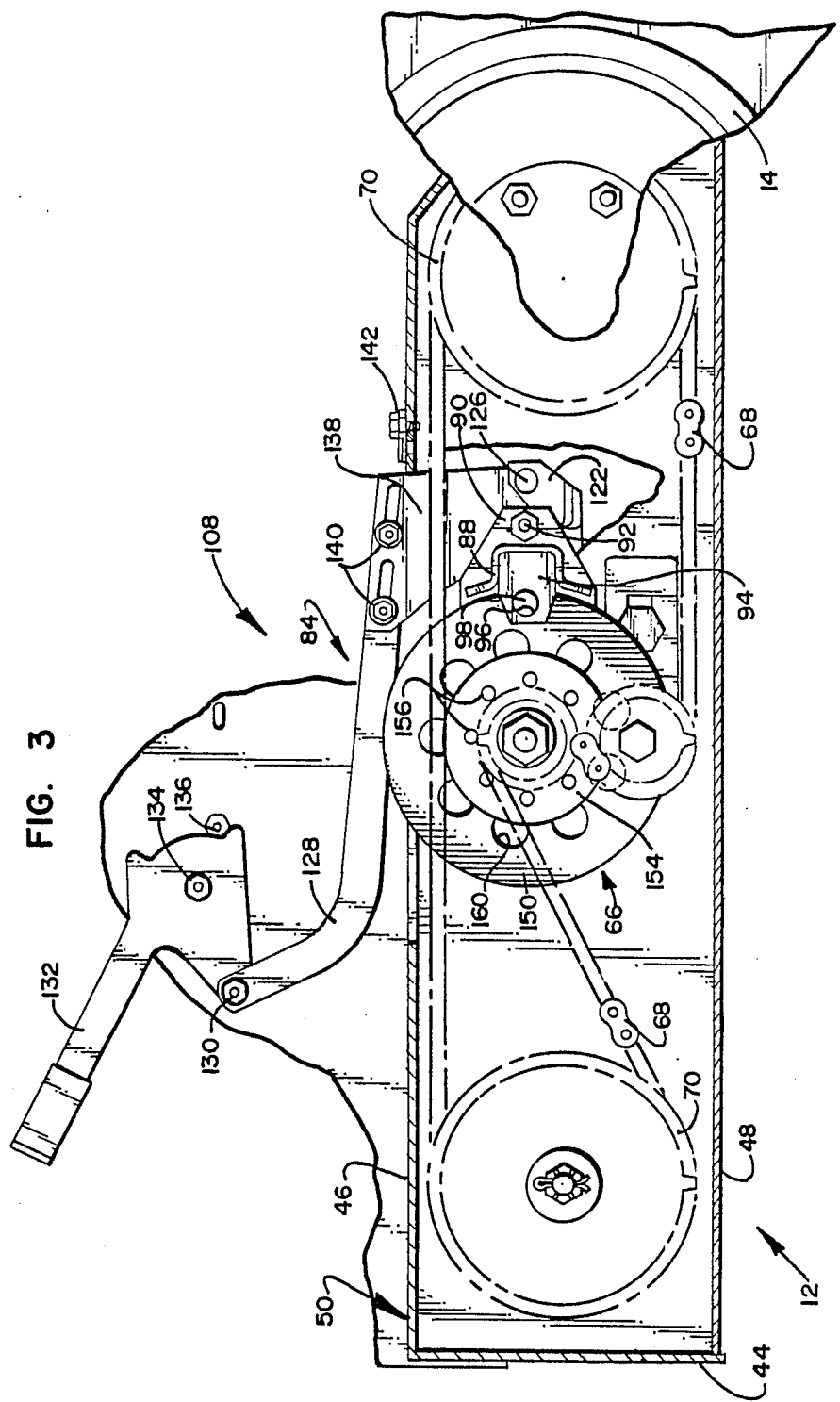
FIG. 3 is a side view of a portion of the frame shown in FIG. 2.

The constructional details of the hydrostatic transmissions of the skid steer loader 10 are shown in FIGS. 2 and 3. The frame 12, which is preferably constructed like the unitary frame shown in U.S. Pat. No. 4,514,007, includes a pair of laterally spaced-apart longitudinal side plates 42, transverse end plates 44 secured across the front and rear ends of the longitudinal plates, and a top plate 46 and a bottom plate 48 secured across the tops and bottoms of the side and end plates to define a sealed transmission case 50. Plates 42, 44, 46, and 48 can be formed of steel or other suitable metal welded together. It will be thus appreciated that the transmission case 50 is formed by interconnected structural members extending along each side thereof.

A pair of axle shafts 52 extend outwardly from the transmission case 50 on each side of the frame 12. An axle 54 extends through each axle shaft 52. Wheels 14 are secured to the outer ends of the axles 54, while the inner ends of the axles on each side of the skid-steer loader are connected to their respective hydrostatic transmissions 56. The wheels 14 and associated hydrostatic transmissions 56 on each side of the skid-steer loader 10 are independently driven by the tandem pump assembly 34, but commonly braked in unison by the brake system of the invention to be explained herein below.

The hydrostatic transmissions 56 are of substantially symmetrical construction. For clarity, only one transmission 56 and a portion of the other has been shown, however, it will be understood that the case 50 includes two transmissions, one for driving the wheels 14 on each side of the skid-steer loader 10. Each hydrostatic transmission 56 includes a hydraulic motor 58 secured by fasteners 60 to the exterior side of the associated side plate 42. The output shaft 62 of the motor 58 extends through an opening in plate 42 and into the transmission case 50. A drive sprocket 64 is secured to the output shaft together with a pair of brake disc assemblies 66. The brake disc assemblies 66 are connected to the output shaft 62 by means of splines in order to permit limited longitudinal movement of the assemblies on the shaft. As illustrated, two brake disc assemblies 66 are mounted on the output shaft, however, it will understood that one or more disc brake assemblies can be carried on the shaft as desired depending on the braking requirements of the vehicle. A gasket or seal (not shown) is preferably provided between the mounting collar of motor 58 and side plate 42 to seal the transmission 56 against fluid loss. The brake disc assembly 66 and the drive sprocket 64 are thus mounted for rotation in unison with the motor 58.

The drive sprocket 64 of each hydrostatic transmission 56 is drivingly connected by a chain 68 to sprockets 70 mounted on axles 54. As illustrated, the chain 68 extends in a serpentine course around the drive sprocket 64, driven sprockets 70, and an idler sprocket 72. The idler sprocket 72 is preferably mounted for adjustment to provide for proper tensioning of the chain 68. If desired, a chain tensioning arrangement like that shown in U.S. Pat. No. 4,480,708 can be utilized.

It will thus be appreciated that the hydrostatic transmissions 56 are of substantially identical construction and symmetrical disposition. Each transmission 56 includes a motor 58 located outside of the common transmission case 50, which normally contains hydraulic fluid such that chains 68 and sprockets 64, 70, and 72 operate continuously in a bath of lubricant. As shown, the motors 58 are located in opposing relationship such that the shafts 62 and brake disc assemblies 66 rotate about a common axis. If desired, however, the disc assemblies 66 could be located in non-coaxial relationship on shafts other than the motor output shafts, but still independently driven by the separate transmissions.

The brake system 84 includes a caliper assembly 86 extending adjacent to the edges of the brake disc assemblies. The caliper assembly 86 includes a cross piece 88 connected between a pair of plates 90 secured by bolts 92 to the side walls 42. A plurality of inserts 94 are secured to the cross piece 88 laterally spaced apart relationship to define slots extending over the outer margins of the brake disc assemblies 66. Each insert 94 includes a circular aperture therein and together the inserts define a transverse bore 96 for a stack of brake pucks 98, a pair of which are provided on opposite sides of each brake disc assembly 66. As illustrated, the caliper assembly 86 comprises a welded assembly, however, a cast or forged assembly could also be used.

As is best seen in FIG. 2, an adjustable stop 100 is provided at one side of the caliper assembly 86 for closing one end of the transverse bore 96 and engaging the endmost brake puck 98. As illustrated, the axially adjustable stop 100 includes a bolt 102 mounted in a nut 104 secured to the associated end plate 90. Bolt 102 and nut 104 are coaxial with the transverse bore 96. The head of bolt 102 functions as a stop whose axial positioning can be adjusted by turning the bolt. A jam nut 106 is provided for securing bolt 102 in the desired position after adjustment.

An actuator assembly 108 is located at the other end of the caliper assembly 86 for compressing the brake pucks 98 on the brake disc assemblies 66 to effect simultaneous braking of both hydrostatic transmissions 56 of the skid-steer loader 10. The actuator assembly 108 includes a collar 110 and a circular seal 114 is preferably provided between the inside of the collar and shaft of the cam. A bushing or sleeve 116 is mounted on the associated end plate 90 coaxial with the bore 96, but slightly offset from the bore of collar 110. An intermediate spacer 118 and axial follower or plunger 120 are disposed within the sleeve 116 and the next adjacent insert 94 for transferring the compression force from cam 112 to the other endmost brake puck 98 and in turn to the entire stack of brake pucks. As shown, the outer end of plunger 120 is rounded and the face of the cam 112 includes an angled or spiral camming surface which urges the plunger axially inward upon rotation of the cam.

The use of spacer 118 is not required, however, inclusion of the spacer can facilitate interchangeability in adapting the brake system 84 to other applications with minimal modifications.

A manual control is provided for actuating the cam 112. The cam can be actuated either by hand or foot of the operator. As shown, an arm 122 is secured to the outer end of the cam 112 by fastener 124. The arm 122 in turn is connected by a pin 126 to one end of a link 128, which is connected at the other end by a pin 130 to a hand lever 132. Manipulation of the hand lever 152, plunger 120 and optional spacer 118 inwardly to compress the brake pucks 98 and thus arrest movement of both transmissions 56. In accordance with the preferred construction, the hand lever 132 is pivoted to an upright panel of frame 12 at point 134, and is of the over-center type such that the brake system 84 can be locked in the engaged position. A stop 136 cooperates with the hand lever 132 to define the engaged and released positions. The plate 138 is preferably connected between link 128 and arm 126 by a pair of fasteners 140 and corresponding elongate slots to facilitate adjustment of the brake system 84. A removable access cover 142 is preferably provided on the top plate 46 of transmission case 50 to facilitate access to and maintenance of transmissions 56 and brake system 84.

Although the brake disc assemblies 66 of transmissions 56 have been shown mounted on the output shafts 62 of the respective motors 58, it will be appreciated that the brake disc assemblies need not necessarily be mounted on the shafts of the drive motors. For example, the brake disc assemblies can be mounted on splined jack shafts which are drivingly connected to transmissions 56.

Figure 4:
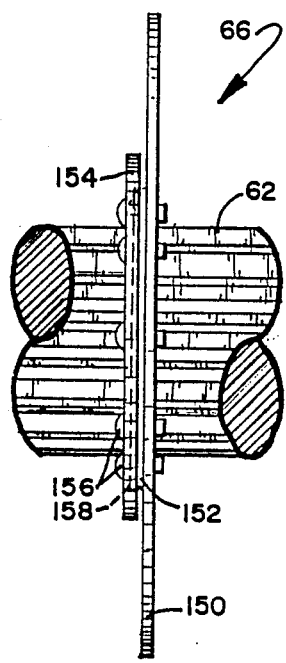
FIG. 4 is an enlarged view of a brake disc assembly mounted on a splined shaft drivingly connected to the hydrostatic transmission.
Figure 5:
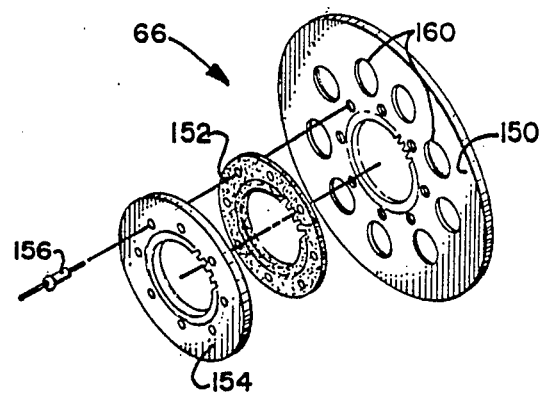
FIG. 5 is an exploded perspective view of the brake disc assembly.

The constructional details of the brake disc assemblies 66 are shown in FIGS. 4. Each brake disc assembly 66 includes a disc plate 150, a dampener ring 152, and a retainer plate 154 secured together by suitable fasteners 156 such as pop rivets or the like. The disc plate 150 and retainer plate 154 are preferably formed of steel plate, while the dampener disc 152 is preferably formed of a suitable resilient material such as 0.125-inch polyurethane that has about 50 percent rebound property. The diameter of the retainer plate 154 is approximately half that of the disc plate 150, and both plates include a tooth-profile center opening for slightly loose receipt of the splined output shaft 62. The retainer plate 154 preferably includes a recess 158 in the inner face for receiving the dampener disc 152, as is best seen in FIG. 4. The dampener disc 152 also includes a center through hole, which is also preferably of suitable tooth-profile, for passage of the splined output shaft 62, however, little or no clearance is necessary because the disc gets compressed between plates 150 and 154 to give zero clearance on the output shaft, although the brake disc assembly 66 can slide or "float" along the shaft due to the compression properties of polyurethane.

The construction of the brake disc assembly 66 comprises a significant feature of the present invention. This sandwich construction is important because it provides an assembly with very low noise transmission which not only eliminates the rattle noise problem associated with the brake system, but also serves to dampen noise generated by the transmission. This brake disc assembly thus becomes an overall noise reducer. In accordance with the preferred embodiment, holes 160 are provided around the brake plate 150 inward of the portion swept by the brake pucks 98 to reduce weight inertia and also to reduce the bell ring effect. These holes 160 also contribute to better cooling and circulation by the lubricant in case 50.

From the forgoing, it will thus be apparent that the present invention comprises a brake noise reduction system having significant advantages over the prior art. Although the brake noise reduction system herein is particularly suited for use with skid-steer loaders, it can also be used with other types of vehicles having hydrostatic transmissions incorporating disc brakes that are splined to drive or driven shafts that tend to rattle during operation of the hydrostatic transmissions. The brake disc assemblies therein incorporate a sandwich construction which serves primarily to dampen rattling of the brake disc, but also serves to help dampen vibration of the transmissions in order to achieve significant overall noise reduction. Such brake disc assemblies are not complicated or expensive and can be easily retrofitted to prior brake systems. Other advantages will be evident to those skilled in the art.

Although particular embodiments of the invention have been illustrated in the accompanying Drawings and described in the forgoing Detailed Description, it will be understood that the invention is not limited only to the specific embodiments disclosed, but is intended to embrace any equivalents, alternatives, modifications and/or rearrangements of elements falling within the scope of the invention as defined by the following claims.

We claim:

1. A brake system for a vehicle having separate independently driven transmission for reducing noise during at least non-braking operation of the transmission comprising:

a plurality of brake disc assemblies mounted for rotation about a common axis, each brake disc assembly being loosely splined to a shaft drivingly connected to one of said transmissions;

each brake disc assembly including a rigid brake disc plate and a rigid retainer plate spaced from the brake disc plate in non-continuous relationship and a resilient disc secured between the rigid brake disc plate and the rigid retainer plate for noise reduction with the brake disc plate being relatively larger in diameter than the retainer plate and resilient disc and further with the rigid brake disc plate, the resilient disc and the rigid retainer plate being individually directly splined to the shaft;

a caliper assembly associated with said brake disc assemblies, said caliper assembly including a transverse bore and longitudinal slots receiving the brake disc plates;

a stop associated with one end of the bore of said caliper assembly;

a slidable plunger disposed in the other end of the bore of said caliper assembly;

a plurality of brake pucks slidably disposed in the bore of said caliper assembly between said plunger and said stop, and on opposite sides of each brake disc; and means for cam-actuating said plunger to compress said brake pucks on said brake disc assemblies to arrest movement of said transmissions.

2. The brake system of claim 1, wherein said stop is axially adjustable.

3. The brake system of claim 1, wherein the resilient disc in each brake disc assembly is formed from polyurethane having a rebound property of about 50%.

4. The brake system of claim 1, wherein the retainer plate of each brake disc assembly includes an inner side facing the associated disc plate with are recess therein for receiving the resilient disc.

5. The brake system of claim 1, wherein the disc plate of each brake disc assembly includes a plurality of circumferentially spaced apart holes therein.

6. A brake disc assembly having low rattle noise characteristics during at least non-braking rotation thereof, which comprises:
    a shaft;
    a rigid disc plate;
    a rigid retainer plate secured to one side of and spaced from said disc plate in non-continuous relationship, said retainer plate being of relatively smaller diameter than said disc plate; and
    a resilient dampener disc engaged between adjacent sides of said disc plate and said retainer plate, each of said plates and said resilient dampener disc including center holes with the center holes in said disc plate, said resilient disc and said retainer plate being splined directly to said shaft.

7. The brake disc assembly of claim 6, wherein said disc plate and said retainer plate are each formed of steel, and wherein said dampener disc is formed from polyurethane.

8. The brake disc assembly of claim 6, wherein the side of said retainer plate adjacent said disc plate is recessed to receive and retain said dampener disc.

9. The brake disc assembly of claim 6, wherein said disc plate includes a plurality of circumferentially spaced apart holes therein.

* * * * *

UNITED STATES PATENT AND TRADEMARK OFFICE
CERTIFICATE OF CORRECTION

PATENT NO.   :   4,796,728

DATED        :   January 10, 1989

INVENTOR(S)  :   Glen G. Kanengieter & David E. Stromberg

It is certified that error appears in the above-identified patent and that said Letters Patent is hereby corrected as shown below:

In column 3, line 15, delete "upright" and substitute therefor --uprights--,

In column 5, line 43, delete "152" and substitute therefor --132--,

In column 5, line 44, after "inwardly" and before "to" insert --serves--, and

In Claim 1, column 6, line 64, delete "transmission" and substitute therefor --transmissions-- and in line 65, delete "transmission" and substitute therefor --transmissions--.

Signed and Sealed this

First Day of August, 1989

*Attest:*

DONALD J. QUIGG

*Attesting Officer*　　　　*Commissioner of Patents and Trademarks*